United States Patent
Banerjee et al.

(10) Patent No.: US 10,161,720 B2
(45) Date of Patent: Dec. 25, 2018

(54) APPARATUSES AND METHODS FOR MAKING AN OBJECT APPEAR TRANSPARENT

(71) Applicants: Toyota Motor Engineering & Manufacturing North America, Inc., Erlanger, KY (US); Toyota Jidosha Kabushiki Kaisha, Toyota-shi Aichi-ken (JP)

(72) Inventors: Debasish Banerjee, Ann Arbor, MI (US); Chengang Ji, Ann Arbor, MI (US); Mayu Takagi, Aichi (JP)

(73) Assignees: TOYOTA JIDOSHA KABUSHIKI KAISHA, Aichi-ken (JP); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 163 days.

(21) Appl. No.: 15/423,149

(22) Filed: Feb. 2, 2017

(65) Prior Publication Data
US 2018/0164079 A1     Jun. 14, 2018

Related U.S. Application Data

(60) Provisional application No. 62/433,011, filed on Dec. 12, 2016.

(51) Int. Cl.
*B60R 13/02* (2006.01)
*F41H 3/00* (2006.01)
(Continued)

(52) U.S. Cl.
CPC ............... *F41H 3/00* (2013.01); *B60R 1/007* (2013.01); *B60R 13/025* (2013.01); *B62D 25/04* (2013.01);
(Continued)

(58) Field of Classification Search
CPC ........ B60R 13/025; B60R 1/007; G02B 17/00; F41H 3/00
(Continued)

(56) References Cited

U.S. PATENT DOCUMENTS 5,941,596 A * 8/1999 See ........................... B60J 1/02
296/193.06
9,405,118 B1    8/2016 Lu
(Continued)

FOREIGN PATENT DOCUMENTS

| CN | 101811476 B | 6/2011 |
| CN | 202345546 U | 7/2012 |

(Continued)

OTHER PUBLICATIONS

"'Cloaking' device uses ordinary lenses to hide objects across range of angles", University of Rochester, Newscenter, published/accessed Sep. 25, 2014; URL: www.rochester.edu/newscenter/watch-rochester-cloak-uses-ordinary-lenses-to-hide-objects-across-continuous-range-of-angles-70592/.

*Primary Examiner* — Pinel E Romain
(74) *Attorney, Agent, or Firm* — Dinsmore & Shohl LLP

(57) ABSTRACT

A cloaking device includes object-side and image-side curved cloaking region boundaries with outward facing mirror surfaces and inward facing opaque surfaces. A cloaking region is bounded by the inward facing opaque surfaces of the object-side and image-side curved CR boundaries. An object-side curved reflection boundary with an inward facing mirror surface is positioned proximate to the object-side curved cloaking region boundary and an image-side curved reflection boundary with an inward facing mirror surface is positioned proximate to the image-side curved cloaking region boundary. Light from an object located on the object-side of the cloaking device and obscured by the cloaking region is redirected around the cloaking region by the (Continued)

outward facing mirror surfaces of the object-side and image-side curved cloaking region boundaries and the inward facing mirror surfaces of the object-side and image-side curved reflection boundaries.

20 Claims, 5 Drawing Sheets

(51) Int. Cl.
    *G02B 17/06*     (2006.01)
    *B62D 25/04*     (2006.01)
    *B60R 1/00*     (2006.01)

(52) U.S. Cl.
    CPC .. *G02B 17/0605* (2013.01); *B60R 2013/0287* (2013.01)

(58) Field of Classification Search
    USPC .................................................... 296/193.06
    See application file for complete search history.

(56) References Cited

U.S. PATENT DOCUMENTS

| | | |
|---|---|---|
| 2015/0183375 A1 | 7/2015 | Wu |
| 2016/0025956 A1 | 1/2016 | Choi et al. |

FOREIGN PATENT DOCUMENTS

| | | |
|---|---|---|
| CN | 103287340 A | 9/2013 |
| CN | 203580786 U | 5/2014 |
| CN | 104590127 A | 5/2015 |
| JP | 2015077927 A | 4/2015 |

* cited by examiner

APPARATUSES AND METHODS FOR MAKING AN OBJECT APPEAR TRANSPARENT

CROSS REFERENCE TO RELATED APPLICATION(S)

This application claims the benefit of U.S. Provisional Application No. 62/433,011 filed Dec. 12, 2016, the entire contents of which are hereby incorporated by reference.

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, an object-side curved cloaking region (CR) boundary with an outward facing mirror surface and an inward facing opaque surface, and an image-side curved CR boundary with an outward facing mirror surface and an inward facing opaque surface. A CR is bounded by the inward facing opaque surfaces of the object-side curved CR boundary and image-side curved CR boundary. An object-side curved reflection boundary with an inward facing mirror surface is positioned on the object-side of the cloaking device proximate to the object-side curved CR boundary and an image-side curved reflection boundary with an inward facing mirror surface is positioned on the image-side of the cloaking device proximate to the image-side curved CR boundary. Light from an object positioned on the object-side of the cloaking device and obscured by the CR is redirected around the CR via reflection, focusing and defocusing of the light by the outward facing mirror surface of the object-side curved CR boundary, inward facing mirror surface of the object-side curved reflection boundary, inward facing mirror surface of the image-side curved reflection boundary and outward facing mirror surface of the image-side curved CR boundary. The light redirected around the CR fauns an image of the object on the image-side of the cloaking device such that the light from the object appears to pass through the CR.

In embodiments, the outward facing mirror surface of the object-side curved CR boundary and the inward facing mirror surface of the object-side curved reflection boundary are shaped, positioned and spaced apart from each other such that the outward facing mirror surface reflects and focuses light to a focal point positioned between the outward facing mirror surface of the object-side curved CR boundary and the inward facing mirror surface of the outward-side curved reflection boundary. Also, the inward facing mirror surface of the image-side curved reflection boundary and the outward facing mirror surface of the image-side curved CR boundary may be shaped, positioned and spaced apart from each other such that the inward facing mirror surface reflects and focuses light to a focal point positioned between the inward facing mirror surface of the image-side curved reflection boundary and the outward facing mirror surface of the image-side curved CR boundary.

According to another embodiment, a cloaking device for cloaking an article of a vehicle includes a cloaking assembly with an object-side, an image-side, two object-side curved CR boundaries and two image-side curved CR boundaries. A CR is bounded by the two object-side curved CR boundaries and the two image-side curved CR boundaries. Two object-side curved reflection boundaries are proximate the two object-side curved CR boundaries and two image-side curved reflection boundaries are positioned proximate the two image-side curved CR boundaries. The two object-side curved CR boundaries, two object-side curved reflection boundaries, two image-side curved CR boundaries and two image-side curved reflection boundaries are configured to redirect light from an object positioned on the object-side of the cloaking device and obscured by the CR around the CR to form an image of the object on the image-side of the cloaking device such that the light from the object appears to pass through the CR. The outward facing mirror surfaces of the two object-side curved CR boundaries and the inward facing mirror surfaces of the two object-side curved reflection boundaries are shaped, positioned and spaced apart from each other such that the outward facing mirror surfaces reflect and focus light to focal points positioned between each of the outward facing mirror surfaces of the two object-side curved CR boundaries and the inward facing mirror surfaces of the two object-side curved reflection boundaries. Also, the inward facing mirror surfaces of the two image-side curved reflection boundaries and the outward facing mirror surfaces of the two image-side curved CR boundaries may be shaped, positioned and spaced apart from each other such that the inward facing mirror surfaces reflect and focus light to focal points positioned between each of the inward facing mirror surfaces of the two image-side curved reflection boundaries and the outward facing mirror surfaces of the two image-side curved CR boundaries.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of curved mirrors which direct incoming light around a cloaked region. The cloaking devices described herein may utilize parabolic mirrors to reflect, focus and defocus light from an object. The cloaking devices described herein may be used to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. The utilization of the curved mirrors allows a driver to perceive an image which, if not for the cloaking device, would be obstructed by a pillar of the vehicle. Various embodiments of cloaking devices and methods for using the same will be described in further detail herein with specific reference to the appended drawings.

Figure 1:
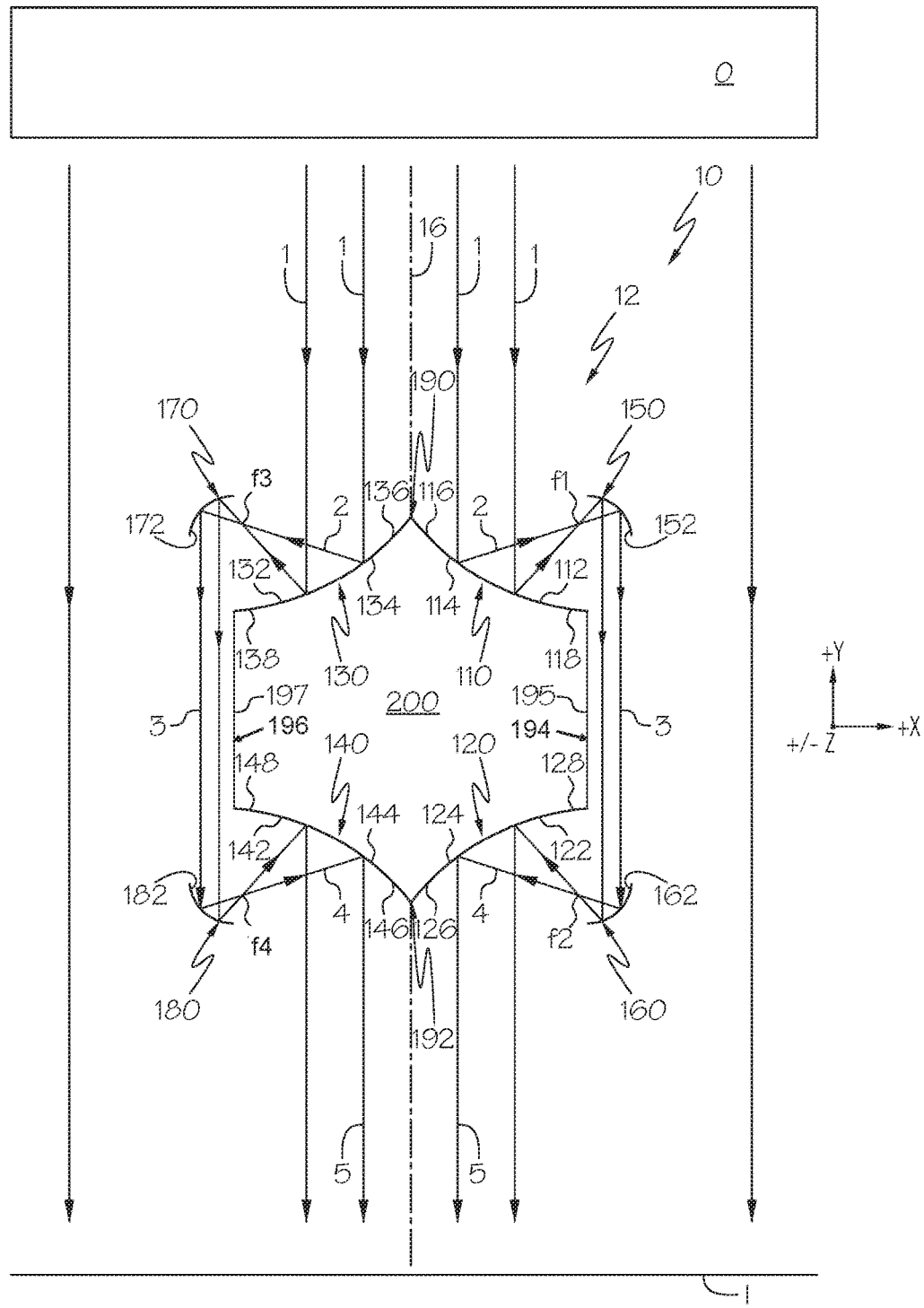
FIG. 1 schematically depicts a top view of a cloaking device according to one or more embodiments disclosed and described herein.

FIG. 1 generally depicts one embodiment of a cloaking device. The cloaking device includes a cloaking region (CR) that is at least partially bounded by at least two curved CR boundaries. As used herein, the terms "boundaries" and "boundary" refer to a physical surface. One of the curved CR boundaries may be an object-side curved CR boundary and another of the curved CR boundaries may be an image-side curved CR boundary. An object-side curved reflection boundary may be positioned proximate to the object-side curved CR boundary and an image-side curved reflection boundary may be positioned proximate to the image-side curved CR boundary. The object-side curved CR boundary is configured to reflect incident light from an object positioned on an object-side of the cloaking device onto the object-side curved reflection boundary. The object-side curved reflection boundary is configured to reflect incident light reflected from the object-side curved CR boundary generally parallel onto the image-side curved reflection boundary. The image-side curved reflection boundary is configured to reflect incident light reflected from the object-side curved reflection boundary onto the image-side curved CR boundary. The image-side curved CR boundary is configured to reflect incident light reflected from the image-side curved reflection boundary and provide an image on the image side of the cloaking device.

Referring now to FIG. 1, embodiments of a cloaking device include a cloaking assembly 10 with an object-side 12, an image-side 14 and four curved CR boundaries 110, 120, 130, 140. Each of the four curved CR boundaries 110, 120, 130, 140 have a length along the X-axis, a width along the Y-axis and a height along the Z-axis shown in the figures. That is, the X-axis shown in the figures extends along a length of the four curved CR boundaries 110, 120, 130, 140, the Y-axis shown in the figures extends along a width of the four curved CR boundaries 110, 120, 130, 140, and the Z-axis shown in the figures extends along a height of the four curved CR boundaries 110, 120, 130, 140. The two curved CR boundaries 110, 130 may be positioned on the object-side 12 of the cloaking assembly 10 to face an object 'O' and may be referred to herein as object-side curved CR boundaries 110, 130. The two curved CR boundaries 120, 140 may be positioned on the image-side 14 of the cloaking assembly 10 to provide an image 'I' formed by the cloaking assembly 10 and may be referred to herein as image-side curved CR boundaries 120, 140.

The curved CR boundaries 110, 120, 130, 140 each have an outward facing mirror surface 112, 122, 132, 142 and an inward facing opaque surface 114, 124, 134, 144, respectively. The term "outward" used herein refers to a surface that faces away and/or reflects light away from a CR 200 and the term "inward" used herein refers to a surface that faces towards and/or reflects light towards the CR 200. The outward facing mirror surfaces 112, 122, 132, 142 can be made from omnidirectional photonic crystals or mirrors such that approximately 100% (+/−10%) of light incident on the outward facing mirror surfaces 112, 122, 132, 142 is reflected there from. Accordingly, the term "mirror surface" used herein refers to a surface that reflects approximately 100% (+/−10%) of all modes of light (e.g. s-polarized light and p-polarized light) incident on the mirror surface.

The curved CR boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the curved CR boundaries 110, 120, 130, 140 extend between apex ends 116, 126, 136, 146 and side ends 118, 128, 138, 148, respectively. In embodiments, the apex ends 116, 136 of the two object-side curved CR boundaries 110, 130, respectively, meet or intersect at an apex 190, and in the alternative or in addition to, the apex ends 126, 146 of the two image-side curved CR boundaries 120, 140, respectively, meet or intersect at an apex 192. An apex line 16 bisects the apex 190 and the apex 192. In embodiments, the apex line 16 may be a centerline of the cloaking assembly 10. A side CR boundary 194 may extend from the side end 118 of the object-side curved CR boundary 110 to the side end 128 of the image-side curved CR boundary 120 and a side CR boundary 196 may extend from the side end 138 of the object-side curved CR boundary 130 to the side end 148 of the image-side curved CR boundary 140. The side CR boundaries 194, 196 may have inward facing opaque surfaces 195, 197, respectively, and outward facing surfaces that may be transparent, opaque or mirror surfaces. In embodiments, side CR boundaries 194, 196 do not extend between side ends 118, 128 and 138, 148, respectively, e.g., the side end 118 may be positioned adjacent to and may be joined to side end 128 and the side end 138 may be positioned adjacent to and may be joined to side end 148.

In embodiments, the two object-side curved CR boundaries 110, 130 and two image-side curved CR boundaries 120, 140 form the CR 200 that is bound at least partly by the inward facing opaque surfaces 114, 134, 124, 144. The two object-side curved CR boundaries 110, 130 and two image-side curved CR boundaries 120, 140 have a height 'h' (FIG. 5) in the Z-direction of the coordinate axes in the figures and light reflected or transmitted within the CR 200 does not pass through the inward facing opaque surfaces 114, 134, 124, 144. Accordingly, an article (e.g., a cloaked article) located within the CR 200 is not visible to an observer viewing the cloaking assembly 10 from the image-side 14 in the +Y direction.

Still referring to FIG. 1, curved reflection boundaries 150, 160, 170, 180 are spaced apart from and positioned proximate to the curved CR boundaries 110, 120, 130, 140, respectively. The two curved reflection boundaries 150, 170 positioned proximate the object-side curved CR boundaries 110, 130, respectively, may be referred to herein as object-side curved reflection boundaries 150, 170 and the two curved reflection boundaries 160, 180 positioned proximate the image-side curved CR boundaries 120, 140, respectively, may be referred to herein as image-side curved reflection boundaries 160, 180. The object-side curved reflection boundary 150 has an inward facing mirror surface 152 facing the outward facing mirror surface 112 of the object-side curved CR boundary 110, the image-side curved reflection boundary 160 has an inward facing mirror surface 162 facing the outward facing mirror surface 122 of the image-side curved CR boundary 120, the object-side curved reflection boundary 170 has an inward facing mirror surface 172 facing the outward facing mirror surface 132 of the object-side curved CR boundary 130 and the image-side curved reflection boundary 180 has an inward facing mirror surface 182 facing the outward facing mirror surface 142 of the image-side curved CR boundary 140. In embodiments, the curved reflection boundaries 150, 160 are positioned to the side (+X direction) of the object-side curved CR boundary 110 and image-side curved CR boundary 120 such that light reflected from the inward facing mirror surface 152 to the inward facing mirror surface 162 is not obstructed by side ends 118, 128 and/or side CR boundary 194. The curved reflection boundaries 170, 180 are positioned to the side (-X direction) of the object-side curved CR boundary 130 and image-side curved CR boundary 140 such that light reflected from the inward facing mirror surface 172 to the inward facing mirror surface 182 is not obstructed by side ends 138, 148 and/or side CR boundary 196.

The inward facing mirror surfaces 152, 162, 172, 182, can be made from omnidirectional photonic crystals or mirrors such that approximately 100% (+/-10%) of light incident on the outward facing mirror surfaces is reflected from the outward facing mirror surfaces.

The object-side curved reflection boundary 150 is positioned relative to the object-side curved CR boundary 110 such that light from the object O (shown as arrows '1' in FIG. 1) incident on the outward facing mirror surface 112 is reflected onto the inward facing mirror surface 152 (shown as arrows '2' in FIG. 1). In embodiments, light 2 reflected from the outward facing mirror surface 112 is focused to a focal point $f_1$ located between and spaced apart from the outward facing mirror surface 112 and inward facing mirror surface 152. Accordingly, reflected light 2 is focused to the focal point $f_1$ and then defocuses before reaching and being incident on the inward facing mirror surface 152. Light 1 incident on the outward facing mirror surface 112 along the height h (Z-direction) of the object-side curved CR boundary 110 may be generally focused to a line intersecting the focal point $f_1$ and extending in the Z-direction before defocusing, reaching, and being incident on the inward facing mirror surface 152 along the height h of the object-side curved reflection boundary 150. It is also understood that light 1 may be light reflected from the object O, illuminated from or by the object O, and the like.

The object-side curved reflection boundary 170 is positioned relative to the object-side curved CR boundary 130 such that light from the object O (shown as arrows '1' in FIG. 1) incident on the outward facing mirror surface 132 is reflected onto the inward facing mirror surface 172 (shown as arrows '2' in FIG. 1). In embodiments, light 2 reflected from the outward facing mirror surface 132 is focused to a focal point $f_3$ located between and spaced apart from the outward facing mirror surface 132 and inward facing mirror surface 172. Accordingly, reflected light 2 is focused to the focal point $f_3$ and then defocuses before reaching and being incident on the inward facing mirror surface 172. Light 1 incident on the outward facing mirror surface 132 along the height h (Z-direction) of the object-side curved CR boundary 130 may be generally focused to a line intersecting the focal point $f_3$ and extending in the Z-direction before defocusing, reaching, and being incident on the inward facing mirror surface 172 along the height h of the object-side curved reflection boundary 170.

Light 1 incident on the cloaking assembly 10 on the right hand side (+X direction) of the apex line 16 is incident on and reflected by the outward facing mirror surface 112 onto the inward facing mirror surface 152 and light 1 incident on the cloaking assembly 10 on the left hand side (-X direction) of the apex line 16 is incident on and reflected by the outward facing mirror surface 132 onto the inward facing mirror surface 172.

Figure 2:
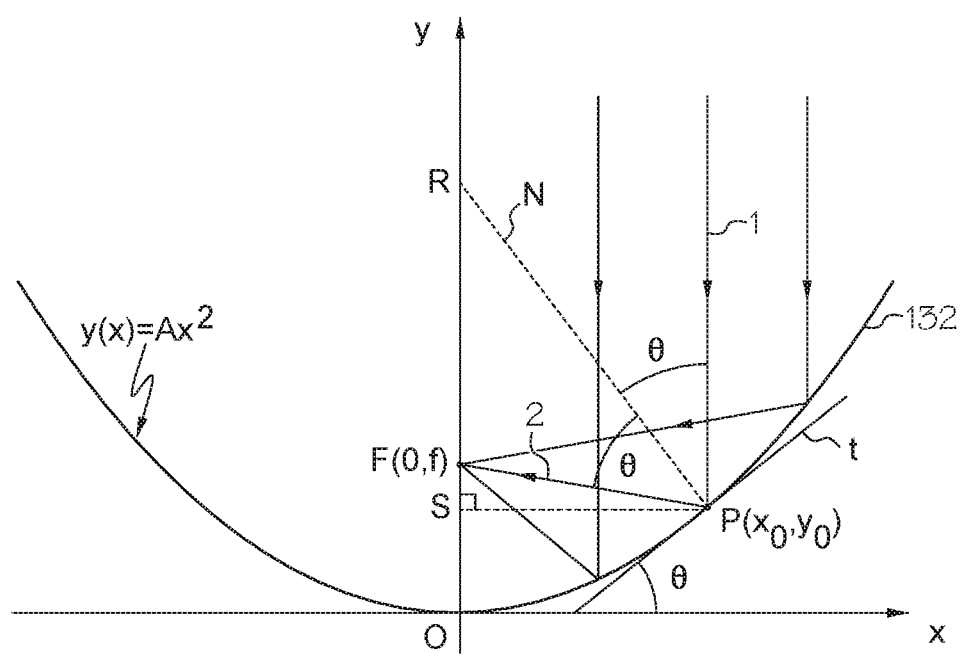
FIG. 2 schematically depicts reflection from a curved mirror according to one or more embodiments disclosed and described herein.

As noted above, the outward facing mirror surfaces 112, 132 may focus incident light 1 to the focal point $f_1$ before defocusing, reaching and being incident on the inward facing mirror surface 152, 172, respectively. For example and without limitation, the outward facing mirror surfaces 112, 132 may have a curved shape described by the expression:

$$y = \frac{x^2}{R\left(1 + \sqrt{1 - (1+K)\left(\frac{K^2}{R^2}\right)}\right)} \quad (1)$$

where R is the radius of curvature of the outward facing mirror surfaces 112, 132. In embodiments, the curved shape is parabolic, K=-1 and expression (1) reduces to:

$$y = \frac{x^2}{2R} = Ax^2 \quad (2)$$

where A =1/2R is a constant. For purposes of illustration, FIG. 2 depicts a parabolic shape, e.g., for outward facing mirror surface 132, plotted on an X-Y Cartesian coordinate system. Assuming a light ray 1 is incident on the outward facing mirror surface 132 at a point $P(x_0,y_0)$, the incident light ray 1 has an angle 'θ' with respect to the normal 'N' of the curve y(x) at $P(x_0,y_0)$. Also the angle between the +X-axis and the tangent line to the curve y(x) at $P(x_0,y_0)$ is also θ and tan θ=dy/dx=$2Ax_0$. Assuming the light ray 1 incident at point $P(x_0,y_0)$ is reflected as light ray 2 and intersects the Y-axis at focal point F(0,f), f may be expressed as:

$$f = y_0 = x_0\tan(90° - 2\theta) \quad (3)$$

$$= y_0 + x_0/\tan 2\theta \quad (4)$$

$$= Ax_0^2 + x_0/[2\tan\theta/(1-\tan 2\theta)] \quad (5)$$

$$= 1/4A \quad (6)$$

which is a constant and independent of location on the point P on the curve y(x). That is, all light 1 incident on the outer facing mirror surface 132 along the −Y direction is geometrically focused to the focal point F(0,f) with f=1/4A. Also, all light 1 incident along the height h of the outward facing mirror surface 132 is geometrically focused to a line intersecting the focal point F(0,f) and extending in the Z-direction. Accordingly, light 1 along the height h of the outward facing mirror surfaces 112, 132 is reflected and focused to lines that intersect the focal points $f_3$, respectively, before defocusing, reaching and being incident on inward facing mirror surfaces 152, 172, respectively. It is understood from expressions (1)-(6) that the location of the focal points $f_1$, $f_2$, $f_3$, $f_4$ may be adjusted by adjusting the size and shape of the outward facing mirror surface 112, inward facing mirror surface 162, outward facing mirror surface 132 and inward facing mirror surface 182, respectively. For example and without limitation, the outer facing mirror surface 132 may have a width (X-direction) of about 50 millimeters (mm) and be described by the expression $y(x) = x^2/100$ for ($0 \leq x \leq 50$). In such an example the focal point $f_3$ for the outward facing mirror surface 132 about 25 mm. Also, the inward facing mirror surface 182 may have a width (X-direction) of about 5 mm, may be described by the expression $y(x)=x^2/10$ for ($0 \leq x \leq 5$) and the focal point $f_4$ for the inward facing mirror surface 182 is about 2.5 mm.

Still referring to FIG. 1, the inward facing mirror surface 152 of the object-side curved reflection boundary 150 is positioned outward in the +X direction relative to the outward facing mirror surface 112 such that light 2 incident on the inward facing mirror surface 152 from the outward facing mirror surface 112 is reflected parallel as light 3 in the −Y direction. In embodiments, the inward facing mirror surface 152 is a parabolic shaped mirror surface oriented generally 180° about the Z-axis relative to the outward facing mirror surface 112 and reflects light 2 in a parallel manner to the inward facing mirror surface 162 of the image-side curved reflection boundary 160. The curvature of the inward facing mirror surface 152 may be the same or different from the curvature of the outward facing mirror surface 112. The inward facing mirror surface 162 may be a parabolic shaped mirror surface oriented generally 90° about the Z-axis relative to the inward facing mirror surface 152. The curvature of the inward facing mirror surface 162 may be the same or different from the curvature of the inward facing mirror surface 152.

The inward facing mirror surface 162 of the image-side curved reflection boundary 160 is positioned in the +X direction relative to the outward facing mirror surface 122 such that light 3 incident on the inward facing mirror surface 162 from the inward facing mirror surface 152 is reflected parallel as light 4 in the −Y and focused at focal point $f_2$ located between and spaced apart from the inward facing mirror surface 162 and outward facing mirror surface 122. Accordingly, the reflected light 4 is focused at the focal point $f_2$ and then defocuses before reaching and being incident on the outward facing mirror surface 122. The curvature of the inward facing mirror surface 162 may be the same or different from the curvature of the outward facing mirror surface 122. It is understood that light 3 incident on the inward facing mirror surface 162 along the height h (Z-direction) of the image-side curved reflection boundary 160 may be generally focused to a line intersecting the focal point $f_2$ and extending in the Z-direction before defocusing and reaching the outward facing mirror surface 122 along the height h of the image-side curved CR boundary 120. In embodiments, the outward facing mirror surface 122 is a parabolic shaped mirror surface oriented generally 180° about the X-axis relative to the outward facing mirror surface 112.

Similar to the inward facing mirror surface 152, the inward facing mirror surface 172 of the object-side curved reflection boundary 170 is positioned outward in the −X direction relative to the outward facing mirror surface 132 such that light 2 incident on the inward facing mirror surface 172 from the outward facing mirror surface 132 is reflected parallel as light 3 in the −Y direction. In embodiments, the inward facing mirror surface 172 is a parabolic shaped mirror surface oriented generally 180° about the Z-axis relative to the outward facing mirror surface 132 and reflects light 2 in a parallel manner to the inward facing surface 182 of the image-side curved reflection boundary 180. The curvature of the inward facing mirror surface 172 may be the same or different from the curvature of the outward facing mirror surface 132. The inward facing mirror surface 182 may be a parabolic shaped mirror surface oriented generally 90° about the Z-axis relative to the inward facing mirror surface 172. The curvature of the inward facing mirror surface 182 may be the same or different from the curvature of the inward facing mirror surface 172.

The inward facing mirror surface 182 of the image-side curved reflection boundary 180 is positioned outward in the +X direction relative to the outward facing mirror surface 142 such that light 3 incident on the inward facing mirror surface 182 from the inward facing mirror surface 172 is reflected as light 4 and focused at focal point $f_4$ located between and spaced apart from the inward facing mirror surface 182 and outward facing mirror surface 142. Accordingly, reflected light 4 is focused at the focal point $f_4$ and then defocused before reaching and being incident on the outward facing mirror surface 142. The curvature of the inward facing mirror surface 182 may be the same or different from the curvature of the outward facing mirror surface 142. It is understood that light 3 incident on the inward facing mirror surface 182 along the height h (Z-direction) of the image-side curved reflection boundary 180 may be generally focused to a line intersecting the focal point $f_4$ and extending in the Z-direction before defocusing and reaching the outward facing mirror surface 142 along the height h of the image-side curved CR boundary 140. In embodiments, the outward facing mirror surface 142 is a parabolic shaped mirror surface oriented generally 180° about the X-axis relative to the outward facing mirror surface 132.

Still referring to FIG. 1, light 1 from the object 'O' travels in the −Y direction and is incident on the outward facing mirror surfaces 112, 132. Light 1 on the right hand side (+X-direction) of the apex line 16 of the cloaking assembly 10 is reflected and focused by the outward facing mirror surface 112 as light 2 to the focal point $f_1$ before defocusing, reaching and being incident on the inward facing mirror surface 152. Light 2 incident on the inward facing mirror surface 152 is reflected generally parallel by the inward facing mirror surface 152 as light 3 onto the inward facing mirror surface 162. Light 3 is reflected and focused by the inward facing mirror surface 162 as light 4 to the focal point $f_2$ before defocusing, reaching and being incident on the outward facing mirror surface 122. Light 4 incident on the outward facing mirror surface 122 is reflected generally parallel to light 1 in the −Y-direction by the outward facing mirror surface 122 and forms a portion of the image I corresponding to the portion of the object O positioned to the right (+X-direction) of the apex line 16. Light 1 on the left hand side (−X-direction) of the apex line 16 of the cloaking assembly 10 is reflected and focused by the outward facing mirror surface 132 as light 2 to the focal point $f_3$ before defocusing, reaching and being incident on the inward facing mirror surface 172. Light 2 incident on the inward facing mirror surface 172 is reflected generally parallel by the inward facing mirror surface 172 as light 3 onto the inward facing mirror surface 182. Light 3 is reflected and focused by the inward facing mirror surface 182 as light 4 to the focal point $f_4$ before defocusing, reaching and being incident on the outward facing mirror surface 142. Light 4 incident on the outward facing mirror surface 142 is reflected generally parallel to light 1 in the −Y-direction by the outward facing mirror surface 142 and forms a portion of the image I corresponding to the portion of the object O positioned to the left (−X-direction) of the apex line 16. Light 6 from portions of the object O positioned beyond (+/−X directions) the boundaries of the cloaking assembly 10 travel in the −Y direction and is visible to an observer viewing the image-side 14 of the cloaking assembly 10.

Figure 3:
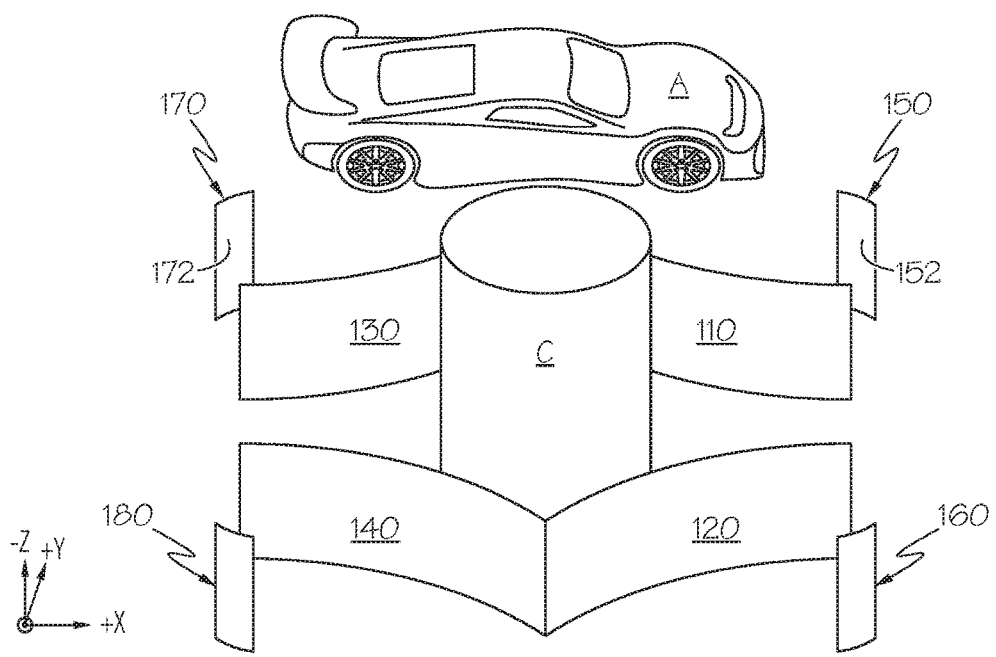
FIG. 3 schematically depicts a top perspective view of the cloaking device of FIG. 1 with a first object on one side of the cloaking device assembly a second object in a cloaking region of the cloaking device.
Figure 4:
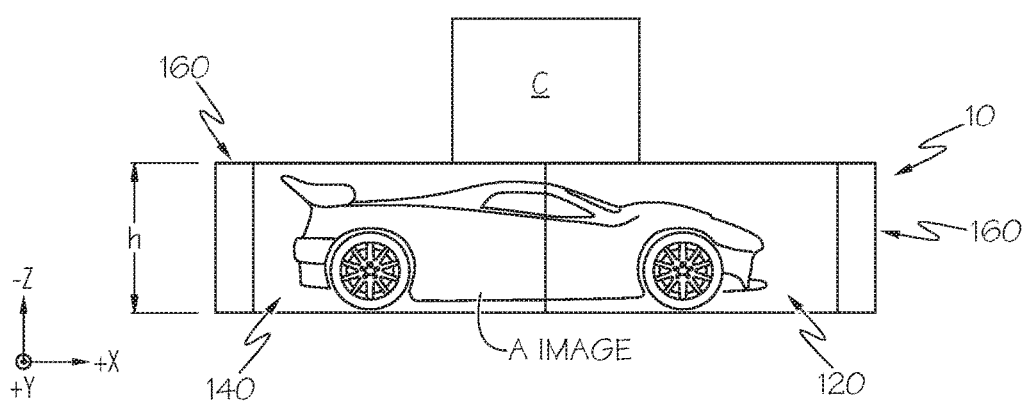
FIG. 4 schematically depicts a side view of the cloaking device of FIG. 3 with the first object on one side of the cloaking device and the second object within the cloaking region of the cloaking device.

Referring now to FIGS. 1, 3 and 4, a top perspective view and a side view of a cloaking device according to embodiments (as discussed with respect to FIGS. 1-2) are shown in FIGS. 3 and 4, respectively. Specifically, FIG. 3 is a top perspective view of an article in the form of a column 'C' within the CR 200 of the cloaking assembly 10 and an automobile 'A' located behind the column C on the object-side 12 of the cloaking assembly 10 in the +Y direction (side CR boundaries 194, 196 not shown). The column C has a height dimension in the Z direction (increasing height in the −Z direction) greater than the height h of the cloaking device. FIG. 4 is a side view from the +Y direction of the cloaking assembly 10 shown in FIG. 3 and shows the portion of the column C that is within the CR 200 is not visible and the automobile A located behind the column C in the +Y direction is visible to an observer viewing the cloaking assembly 10 in the +Y direction. Accordingly, the column C positioned within the CR 200 is not visible to an observer viewing the image-side 14 of the cloaking assembly 10 and an image of the entire automobile A is visible to the observer viewing the image-side 14. Although column C in FIGS. 3 and 4 is separate from the curved CR boundaries 110, 120, 130, 140, i.e., column C is a separate object from the cloaking assembly 10, it should be appreciated that column C may be structurally part of the cloaking assembly 10 and have an outer surface that provides or is equivalent to the curved CR boundaries 110, 120, 130, 140 with outward facing mirror surfaces 112, 122, 132, 142, respectively.

Figure 5:
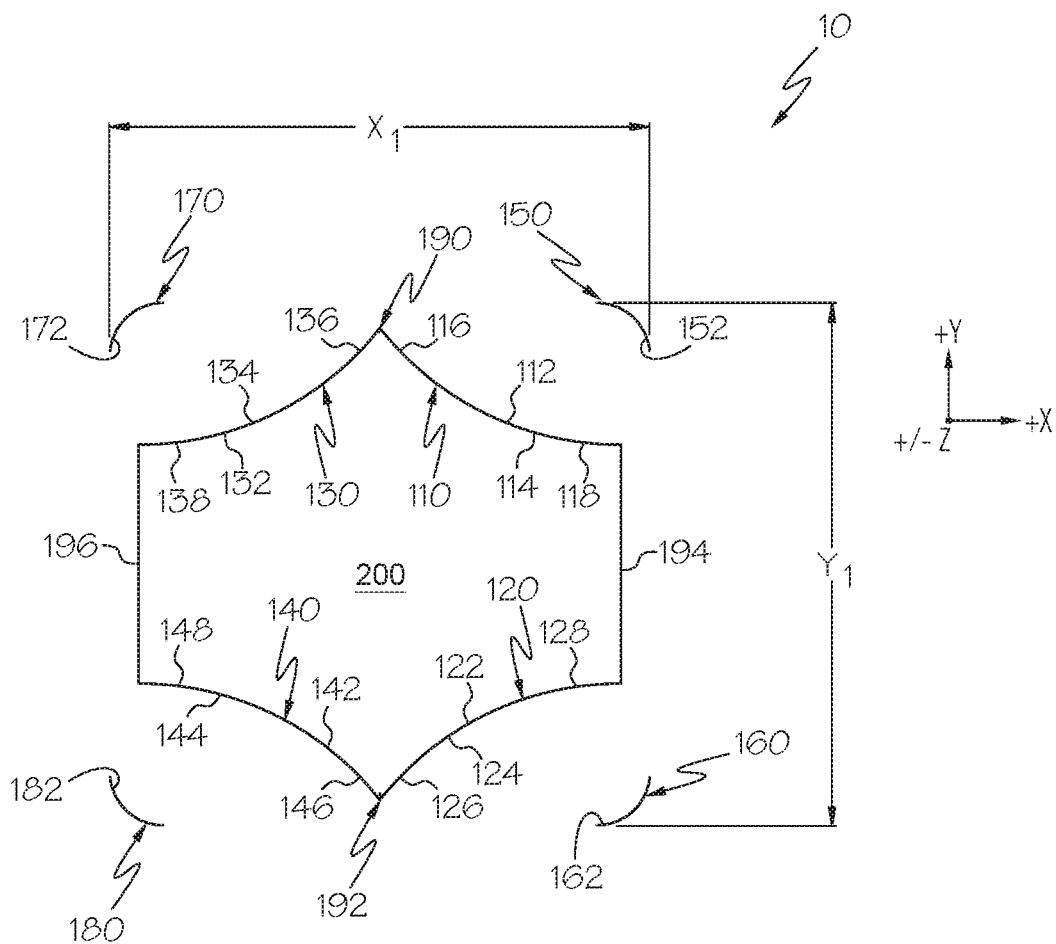
FIG. 5 schematically depicts a top view of the cloaking device of FIG. 1 illustrating dimensions of a footprint cross sectional area of the cloaking device.

Referring now to FIGS. 1 and 5, FIG. 5 depicts footprint dimensions of the cloaking assembly 10. The term "footprint" as used herein refers to the cross-sectional area occupied by the cloaking assembly 10, i.e., the cross-sectional area as defined by outermost boundaries of the cloaking assembly 10. The footprint cross-sectional area of the cloaking assembly 10 depicted in FIG. 5 is $X_1 \cdot Y_1$. The cloaking ratio of the cloaking assembly 10 may be defined as the cross-sectional area of the CR 200 (CR area) along the Z direction divided by the footprint cross-sectional area (footprint area) of the cloaking assembly 10 (cloaking ratio=CR area/footprint area). In embodiments, the cloaking ratio of the cloaking assembly 10 may be between about 0.4 and 0.8. In other embodiments, the cloaking ratio of the cloaking assembly 10 is between about 0.5 and 0.7.

Figure 6:
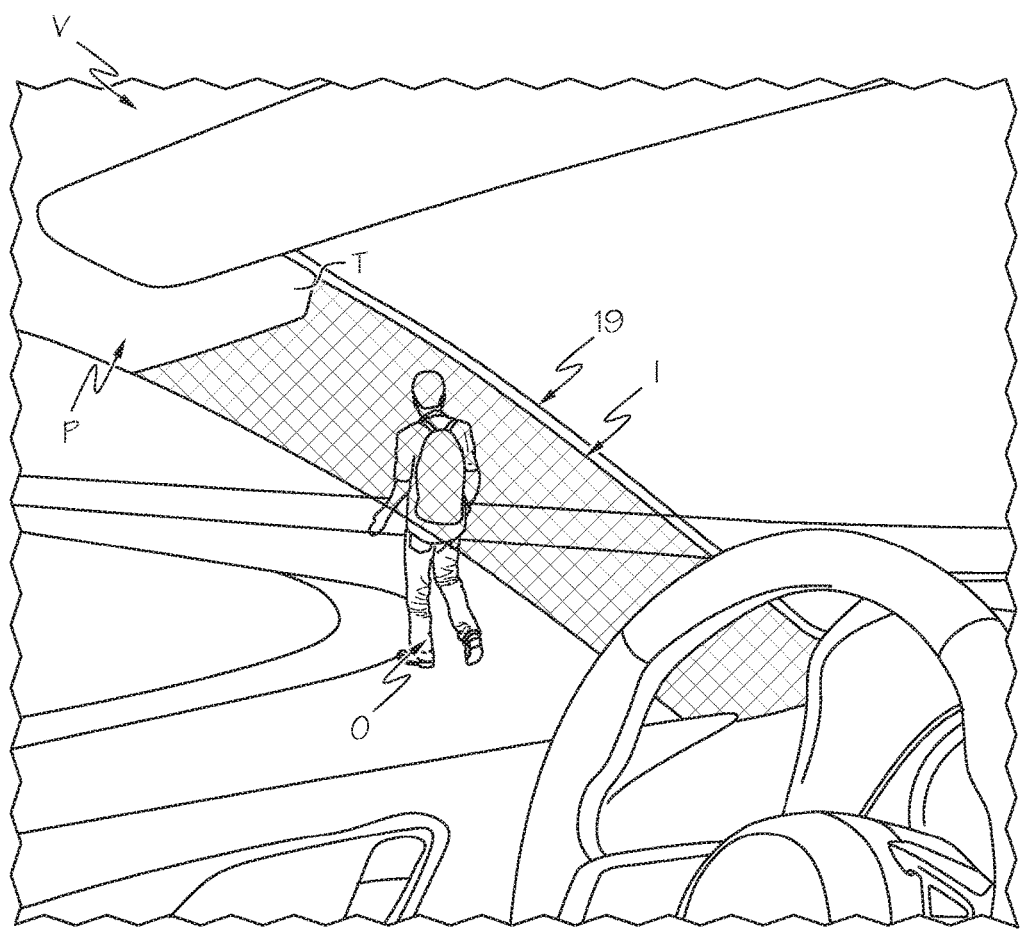
FIG. 6 schematically depicts a cloaking device cloaking a vehicle A-pillar of a vehicle according to one or more embodiments described and illustrated herein.

Referring to FIGS. 1, 3, 4 and 6, embodiments of an A-pillar of a vehicle being cloaked by a cloaking device are shown. Particularly, FIG. 6 shows a cloaking device 19 cloaking a portion of an A-pillar P of a vehicle V. A portion of the A-pillar P is positioned within a CR 200 (not shown) of the cloaking device 19 and a portion of the A-pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the CR 200 of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the CR 200 of the cloaking device 19. In embodiments, the A-pillar P itself serves as the CR 200, i.e. the A-pillar P has an outer surface with one or more outer facing mirror surfaces that assist in redirecting light from the pedestrian) around the A-pillar P. It should be appreciated that cloaking of the A-pillar P with the cloaking device 19 and bypassing the blind spot produced by the A-pillar P is performed without the use of metamaterials, video images, cameras, sophisticated electronics, etc.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. The terms "object," "article," and "item" may interchangeably refer to a visual object or image (2D or 3D) that reflects light or transmits light and the term "light from" may refer to "light reflected from" or "light transmitted from." The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking assembly with a CR bounded by four curved CR boundaries, cloaking assemblies with a CR bounded by two curved CR boundaries are provided. For example and without limitation, a CR may be bounded between an object-side curved CR boundary and an image-side curved CR boundary.

Directional terms as used herein—for example up, down, right, left, front, back, top, bottom, vertical, horizontal—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
an object-side and an image-side;
an object-side curved cloaking region (CR) boundary having an outward facing mirror surface and an inward facing opaque surface and an image-side curved CR boundary having an outward facing mirror surface and an inward facing opaque surface;
a CR bounded by the inward facing opaque surfaces of the object-side curved CR boundary and the image-side curved CR boundary;
an object-side curved reflection boundary having an inward facing mirror surface;
an image-side curved reflection boundary having an inward facing mirror surface;
wherein light from an object positioned on the object-side of the cloaking device and obscured by the CR is redirected around the CR to form an image of the object on the image-side of the cloaking device such that the light from the object appears to pass through the CR.

2. The cloaking device of claim 1, wherein the outward facing mirror surface of the object-side curved CR boundary is configured to reflect and focus incident light from the object positioned on the object-side generally to a focal point located between and spaced apart from the outward facing mirror surface of the object-side curved CR boundary and the inward facing mirror surface of the object-side curved reflection boundary.

3. The cloaking device of claim 2, wherein:
the outward facing mirror surface of the object-side curved CR boundary and the inward facing mirror surface of the object-side curved reflection boundary are parabolic shaped surfaces; and
the inward facing mirror surface of the object-side curved reflection boundary is oriented generally 180° relative to the outward facing mirror surface of the object-side curved CR boundary.

4. The cloaking device of claim 1, wherein the inward facing mirror surface of the object-side curved reflection boundary is configured to reflect incident light from the outward facing minor surface of the object-side curved CR boundary generally parallel to the inward facing mirror surface of the image-side curved reflection boundary.

5. The cloaking device of claim 4, wherein:
the inward facing mirror surface of the object-side curved reflection boundary and the inward facing mirror surface of the image-side curved reflection boundary are parabolic shaped surfaces; and
the inward facing mirror surface of the object-side curved reflection boundary is oriented generally 90° relative to the image-side curved reflection boundary.

6. The cloaking device of claim 1, wherein the inward facing mirror surface of the image-side curved reflection boundary is configured to reflect and focus incident light reflected from the inward facing mirror surface of the object-side curved reflection boundary to a focal point located between and spaced apart from the inward facing mirror surface of the image-side curved reflection boundary and the outward facing mirror surface of the image-side curved CR boundary.

7. The cloaking device of claim 6, wherein:
the inward facing mirror surface of the image-side curved reflection boundary and the outward facing mirror surface of the image-side curved CR boundary are parabolic shaped surfaces; and
the inward facing mirror surface of the image-side curved reflection boundary is oriented generally 90° relative to the inward facing mirror surface of the object-side curved reflection boundary.

8. The cloaking device of claim 1, wherein:
the outward facing mirror surface of the image-side curved CR boundary and the outward facing mirror surface of the image-side curved CR boundary are parabolic shaped surfaces; and
the outward facing mirror surface of the image-side curved CR boundary is oriented generally 180° relative to the outward facing mirror surface of the object-side curved CR boundary.

9. The cloaking device of claim 1, wherein the outward facing mirror surface of the image-side curved CR boundary is configured to reflect defocused incident light from the inward facing mirror surface of the image-side curved reflection boundary to form the image on the image-side of the object positioned proximate to the object-side.

10. The cloaking device of claim 1, wherein;
the outward facing mirror surface of the object-side curved CR boundary is configured to reflect and focus incident light from the object positioned on the object-side generally to a focal point located between and spaced apart from the outward facing mirror surface of the object-side curved CR boundary and the inward facing mirror surface of the object-side curved reflection boundary;
the inward facing mirror surface of the object-side curved reflection boundary is configured to reflect incident light from the outward facing mirror surface of the object-side curved CR boundary generally parallel to the inward facing mirror surface of the image-side curved reflection boundary;
the inward facing mirror surface of the image-side curved reflection boundary is configured to reflect and focus incident light from the inward facing mirror surface of the object-side curved reflection boundary to another focal point located between and spaced apart from the inward facing mirror surface of the image-side curved reflection boundary and the outer facing mirror surface of the image-side curved CR boundary; and
the outward facing mirror surface of the image-side curved CR boundary is configured to reflect defocused incident light from the inward facing mirror surface of the image-side curved reflection boundary to form the image on the image-side of the object positioned proximate to the object-side.

11. The cloaking device of claim 1, further comprising an article positioned within the CR, wherein the light from the object located on the object-side of the cloaking device and obscured by the CR is redirected around the CR and the article to form the image of the object on the image-side of the cloaking device and the article appears transparent.

12. The cloaking device of claim 11, wherein the article is selected from the group consisting of a vehicle A-pillar, a vehicle B-pillar and a vehicle C-pillar.

13. A cloaking device for cloaking an article of a vehicle comprising:
a cloaking assembly comprising:
an object-side and an image-side;
two object-side curved CR boundaries positioned proximate the object-side, each of the two object-side curved CR boundaries comprising an outward facing mirror surface and an inward facing opaque surface;
two object-side curved reflection boundaries positioned proximate the two object-side curved CR boundaries, each of the two object-side curved reflection boundaries comprising an inward facing mirror surface;
two image-side curved CR boundaries positioned proximate the image-side between the object-side and the image-side, each of the two image-side curved CR boundaries comprising an outward facing mirror surface and an inward facing opaque surface;
two image-side curved reflection boundaries positioned proximate the two image-side curved CR boundaries, each of the two image-side curved reflection boundaries comprising an inward facing mirror surface; and
a CR bounded by the inward facing opaque surfaces of the two object-side curved CR boundaries and the two image-side curved CR boundaries;
wherein the outward facing mirror surfaces of the two object-side curved CR boundaries, inward facing mirror surfaces of the two object-side curved reflection boundaries, inward facing mirror surfaces of the two image-side curved reflection boundaries and outward facing mirror surfaces of the two image-side curved CR boundaries are configured to reflect light from an object positioned on the object-side of the cloaking device and obscured by the CR is redirected around the CR to form an image of the object on the image-side of the cloaking device such that the light from the object appears to pass through the CR.

14. The cloaking device of claim 13, wherein the outward facing mirror surfaces of the two object-side curved CR boundaries are parabolic shaped surfaces configured to reflect and focus incident light from the object positioned on the object-side generally to focal points located between and spaced apart from the outward facing mirror surfaces of the two object-side curved CR boundaries and the inward facing mirror surfaces of the two object-side curved reflection boundaries.

15. The cloaking device of claim 13, wherein the inward facing mirror surfaces of the two object-side curved reflection boundaries are parabolic shaped surfaces configured to reflect incident light from the outward facing mirror surfaces of the two object-side curved CR boundaries generally parallel to the inward facing mirror surfaces of the two image-side curved reflection boundaries.

16. The cloaking device of claim 13, wherein the inward facing mirror surfaces of the two image-side curved reflection boundaries are parabolic shaped surfaces configured to reflect and focus incident light reflected from the inward facing mirror surfaces of the two object-side curved reflection boundaries to focal points located between and spaced apart from the inward facing mirror surfaces of the two image-side curved reflection boundaries and the outward facing mirror surfaces of the two image-side curved CR boundaries.

17. The cloaking device of claim 13, wherein the outward facing mirror surfaces of the two image-side curved CR boundaries are parabolic shaped surfaces configured to reflect defocused incident light from the inward facing mirror surfaces of the two image-side curved reflection boundaries to form the image on the image-side of the object positioned proximate to the object-side.

18. A vehicle with a cloaking device comprising:
a vehicle pillar selected from the group consisting of an A-pillar, B-pillar and C-pillar;
a cloaking assembly comprising:
an object-side and an image-side;
an object-side curved cloaking region (CR) boundary having an outward facing mirror surface and an inward facing opaque surface and an image-side curved CR boundary having an outward facing mirror surface and an inward facing opaque surface;
a CR bounded by the inward facing opaque surfaces of the object-side curved CR boundary and the image-side curved CR boundary, wherein at least a portion of the vehicle pillar is positioned within the CR;
an object-side curved reflection boundary having an inward facing mirror surface;
an image-side curved reflection boundary having an inward facing mirror surface;
wherein light from an object located on the object-side of the cloaking device and obscured by the CR is redirected around the portion of the vehicle pillar positioned in the CR to form an image of the object on the image-side of the cloaking device such that the light from the object appears to pass through the vehicle pillar.

19. The vehicle with the cloaking device of claim 18, wherein:
the outward facing mirror surface of the object-side curved CR boundary is a parabolic shaped surface configured to reflect and focus incident light from the object positioned on the object-side generally to a focal point located between and spaced apart from the outward facing mirror surface of the object-side curved CR boundary and the inward facing mirror surface of the object-side curved reflection boundary; and
the inward facing mirror surface of the object-side curved reflection boundary is oriented generally 180° relative to the outward facing mirror surface of the object-side curved CR boundary.

20. The vehicle with the cloaking device of claim 18, wherein:
the inward facing mirror surface of the image-side curved reflection boundary is a parabolic shaped surface configured to reflect and focus incident light reflected from the inward facing mirror surface of the object-side curved reflection boundary to a focal point located between and spaced apart from the inward facing mirror surface of the image-side curved reflection boundary and the outward facing mirror surface of the image-side curved CR boundary; and
the inward facing mirror surface of the image-side curved reflection boundary is oriented generally 90° relative to the inward facing mirror surface of the object-side curved reflection boundary.

* * * * *

UNITED STATES PATENT AND TRADEMARK OFFICE
CERTIFICATE OF CORRECTION

PATENT NO.         : 10,161,720 B2
APPLICATION NO.    : 15/423149
DATED              : December 25, 2018
INVENTOR(S)        : Debasish Banerjee, Chengang Ji and Mayu Takagi It is certified that error appears in the above-identified patent and that said Letters Patent is hereby corrected as shown below:

In the Specification

In Column 6, Line 60, delete "$f = y_0 = x_0 \tan(90° - 2\theta)$" and insert -- $f = y_0 + x_0 \tan(90°-2\theta)$ --, therefor.

Signed and Sealed this
Ninth Day of April, 2019

Andrei Iancu
*Director of the United States Patent and Trademark Office*